United States Patent
Moxley et al.

[19]

[11] Patent Number: 6,153,151
[45] Date of Patent: Nov. 28, 2000

[54] SYSTEM AND METHOD FOR GENERATING OZONATED WATER

[76] Inventors: Douglas A. Moxley, 410 Osprey Point, Ponte Vedra, Fla. 32082; Stephen C. Perry, 205 Churchill Dr., Longwood, Fla. 32779

[21] Appl. No.: 09/368,964

[22] Filed: Aug. 5, 1999

Related U.S. Application Data

[63] Continuation of application No. 08/853,095, May 8, 1997, Pat. No. 5,939,030.

[51] Int. Cl.[7] ....................................................... B01J 19/08
[52] U.S. Cl. ................................ 422/186.07; 422/186.12; 204/176; 8/137; 8/149.1; 68/13 A
[58] Field of Search ......................... 422/186.07, 186.12; 204/176, 664, 660, 557, 554; 8/137, 149.1; 68/13 A

[56] References Cited

U.S. PATENT DOCUMENTS

| | | | |
|---|---|---|---|
| 5,404,732 | 4/1995 | Kim ...................................... | 422/186.12 |
| 5,645,608 | 7/1997 | Cooper et al. ............................... | 8/137 |
| 5,688,289 | 11/1997 | Nishioka et al. ............................. | 8/137 |

*Primary Examiner*—Kishor Mayekar
*Attorney, Agent, or Firm*—Malin, Haley & DiMaggio, P.A.

[57] ABSTRACT

A system and method for generating ozone for use in open or closed loop process applications using a fluid, such as water, as a primary process medium, including: a water storage tank, supplied by a water supply line, for temporarily storing water for treatment and subsequent use in a process; an electromagnetic flux unit connected to the water supply line for exposing water supplied to the tank to an electromagnetic field thereby magnetically polarizing contaminants and dissolved solids present in the water; an apparatus for producing highly pure oxygen from ambient air for use as a feed gas in generating ozone; a corona discharge ozone generator for producing high purity ozone from a highly pure oxygen feed gas; an impeller apparatus, including a rapidly rotating shear impeller, for injecting ozone, created by the ozone generator, into water wherein the ozone is absorbed thus yielding a substantially high level of dissolved ozone gas in a given volume of water; an apparatus for measuring the concentration of dissolved ozone present in water; and a microprocessor based controller for controlling the system to reach and maintain suitable ozone concentration levels, depending on the application, whereby the ozonated water is suitable for use in a wide variety of process applications.

11 Claims, 5 Drawing Sheets

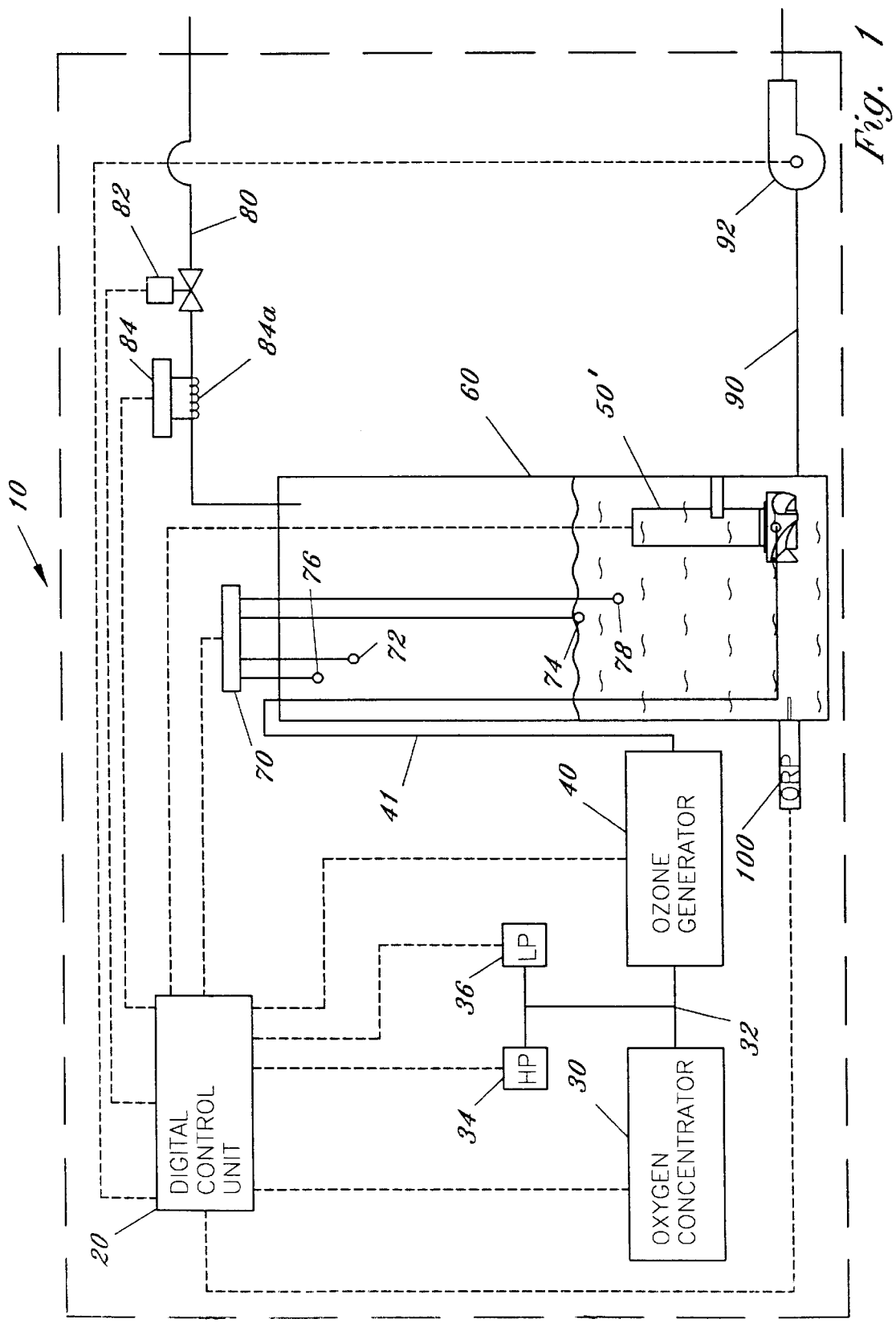

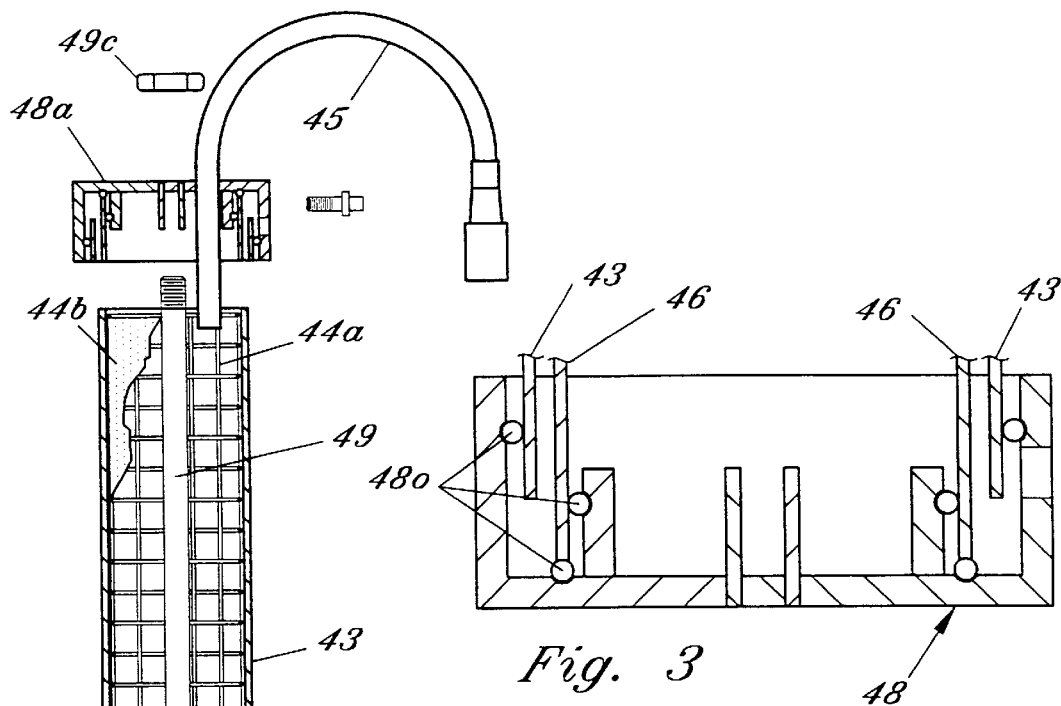
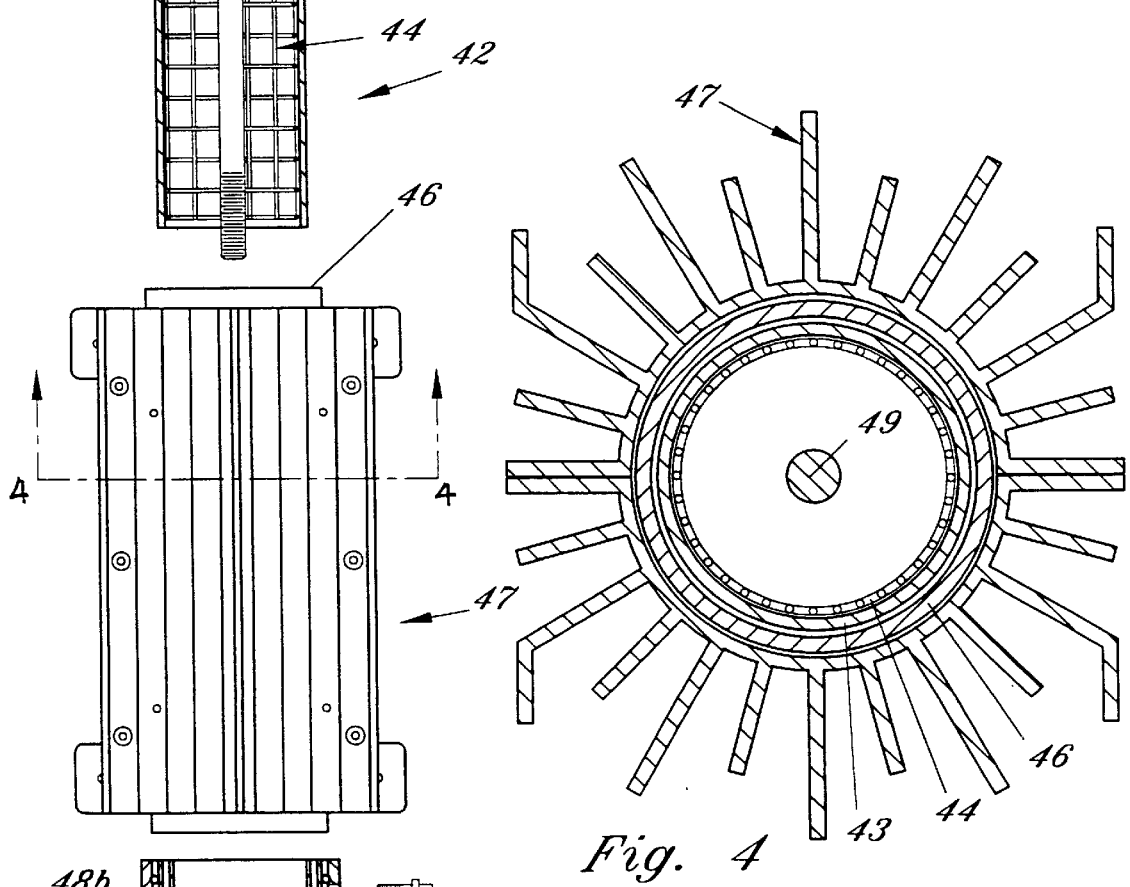
Fig. 3
Fig. 4
Fig. 2

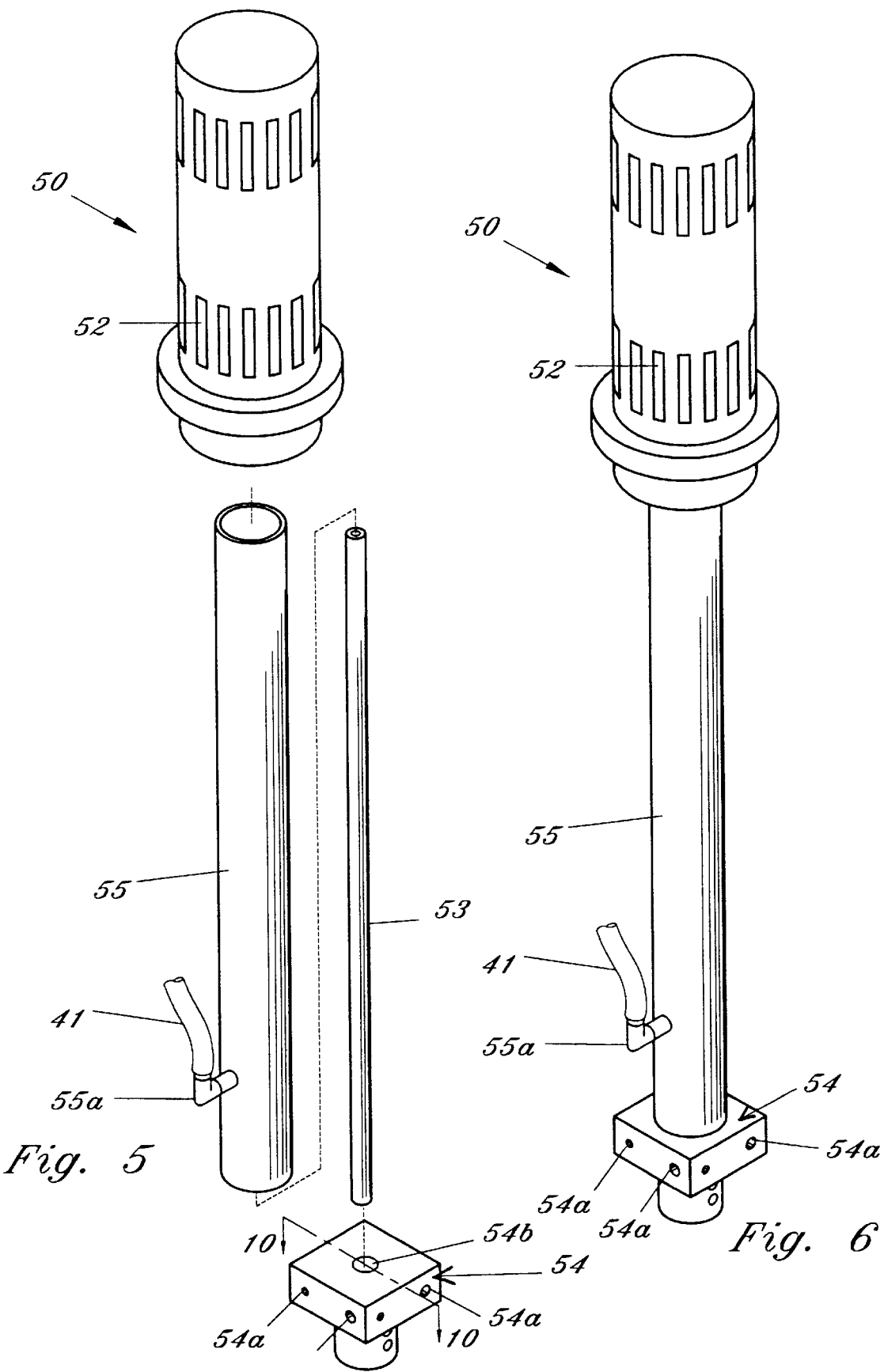

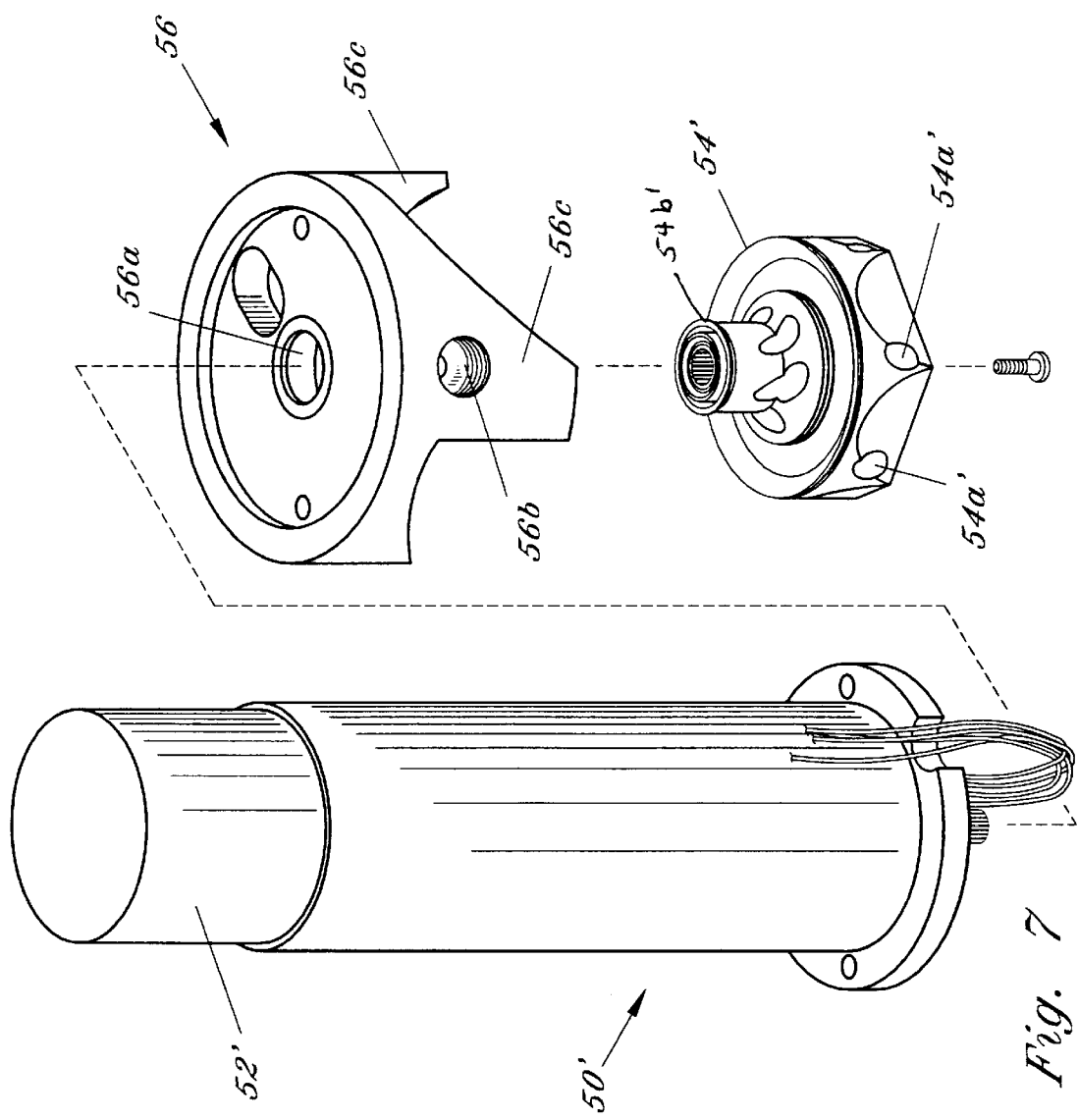

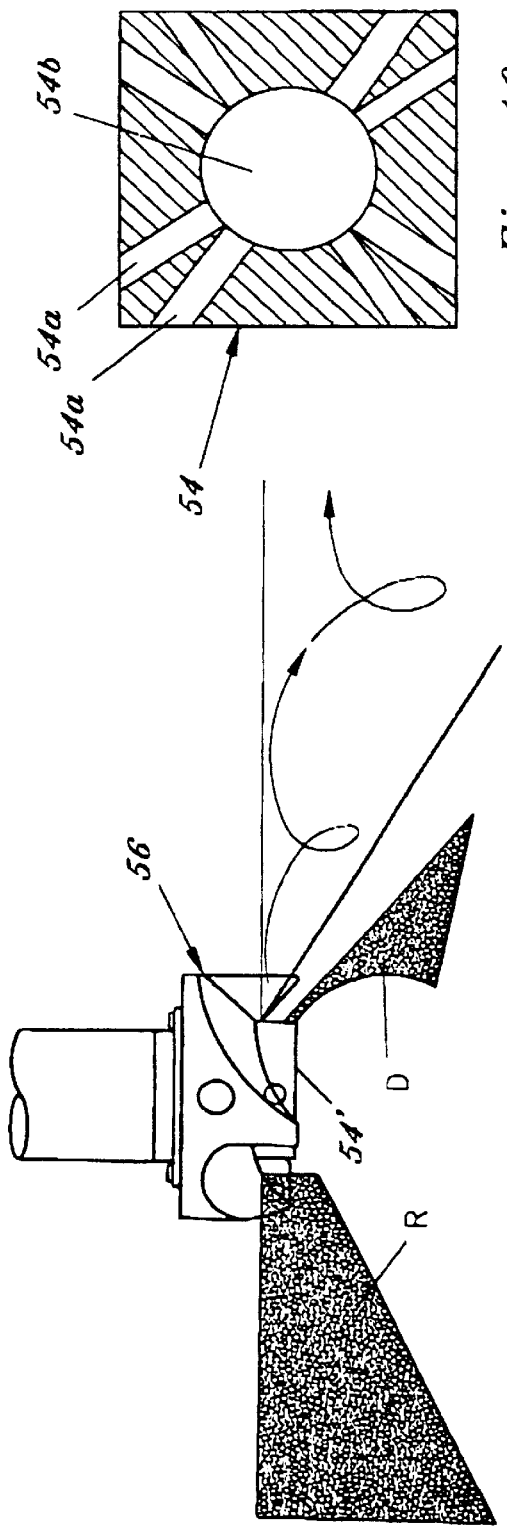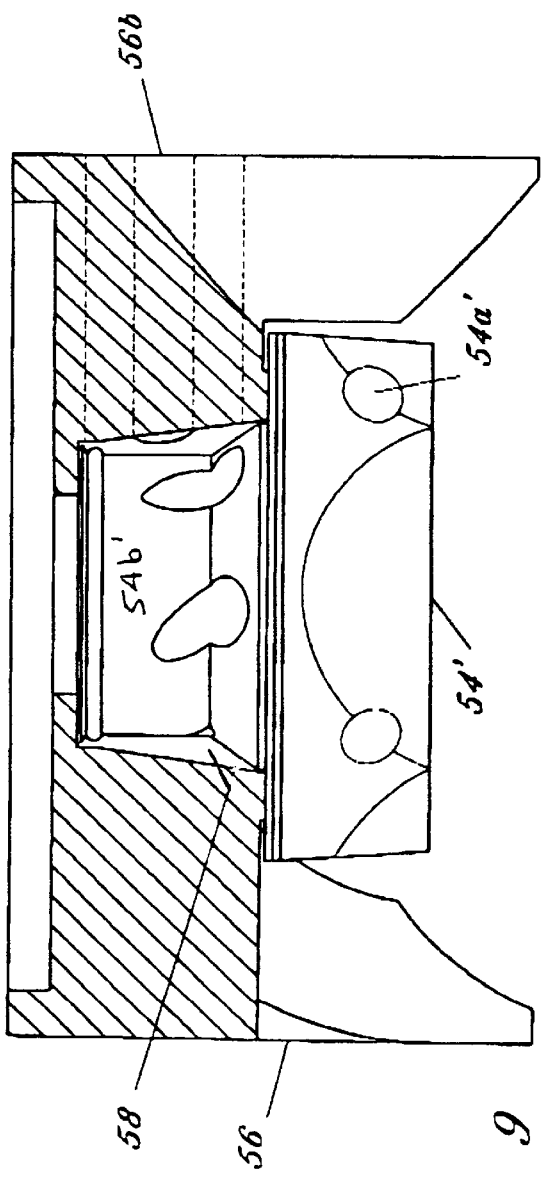

SYSTEM AND METHOD FOR GENERATING OZONATED WATER

This patent application is a continuation of patent application Ser. No. 08/853,095 filed May 8, 1997 now U.S. Pat. No. 5,939,030.

BACKGROUND OF THE INVENTION

1. Field of the Invention

The present invention relates to ozone generation systems, and more particularly to a system and method for generating and dispersing ozone in a fluid, such as water, for use in a wide variety of process applications.

2. Description of the Background Art

Ozone is a naturally occurring oxygen compound designated as $O_3$. Ozone may be generated when oxygen, $O_2$, is exposed to ultraviolet light or an electrical charge which breaks the oxygen down to individual oxygen molecules, which combine to form ozone molecules. Ozone is an unstable, powerful bleaching and oxidizing agent with a pungent irritating odor and is used to purify and deodorize air, to sterilize water, and as a bleaching agent. At the appropriate elevated concentrations, ozone may be used as a sterilizing agent to control airborne organics, molds, fungus, bacteria, and viruses. Accordingly, ozone has been recognized as useful as a disinfectant in a variety of applications. For example, it is known to use ozone in hospital operating rooms, laundry and disposal rooms, in food service applications, in hotels, restaurants, and livestock industries. Furthermore, ozone has proven effective as a bleaching and sterilizing agent in water and has been found to be particularly effective, at appropriate elevated concentration levels, in laundry water.

Typical prior art ozone generators utilize ambient air as a feed gas for the production of ozone. However, there are a number of significant disadvantages in using ambient air to produce ozone. Specifically, since the production of ozone is largely dependent upon the humidity, temperature, contamination and oxygen content of the ambient air, and further because of the abundance of nitrogen in ambient air (ambient air consists of approximately 75% nitrogen and 25% oxygen), prior art ozone generators using ambient air as a feed gas produce inconsistent amounts of ozone. Furthermore, generating ozone in the presence of nitrogen results in the production of nitrous oxides, resulting in the formation of nitric acid often within the ozone generator thereby leading to substantial corrosion problems. Such nitric acid in the ozone generator can, because of its conductive properties, reduce the efficiency of the equipment, and can severely corrode the equipment resulting in a further loss of ozone production efficiency and often irreversible damage to the equipment. In addition, in applications involving the dispersal of ozone in water, the nitric acid byproduct presents a corrosion problem for all downstream system components.

The use of ozone in laundry applications is recognized in the background art. U.S. Pat. No. 5,097,556, issued to Engel et al. discloses a method for washing laundry without hot water and detergent using a closed loop ozonated wash water system wherein wash water maintained in a storage tank is ozonated by an ozone generator prior to use in a washing machine. Engel et al. discloses the use of a submerged ozone injection nozzle spaced from a motor driven impeller for mixing the ozone within water held in a holding tank. The use of a conventional impeller spaced from a submerged ozone injection nozzle has been found not to efficiently mix ozone in water. In addition, Engel et al. uses a plurality of pumps and manufactures ozone from ordinary ambient air.

U.S. Pat. No. 5,409,616, issued to Garbutt et al., discloses a method and apparatus to restore grey water resulting from a cleaning activity such as laundry using ozone as a cleaning agent. Garbutt et al. disclose a process whereby ozone is manufactured from a high purity oxygen feed gas produced utilizing molecular sieves to remove a substantial amount of the nitrogen present in ambient air. Garbutt et al. further discloses a static mixer consisting of a series of spiral blades fitted inside a section of pipe immediately downstream of the ozone injection point. The spiral blades cause a counter-rotating flow of water within the pipe section to improve the mixing effect. According to Garbutt et al., the static mixer effectively blends the ozone and water and allows for a greater volume of ozone to be introduced into a given volume of water. However, since the Garbutt et al. static mixing blades are fixed, blending effectiveness is at best only marginally enhanced.

A further significant aspect relating to the use of ozone in fluids, such as water, involves monitoring and controlling ozone concentration. Neither the Engel et al. reference, nor the Garbutt et al. reference disclose a system or method for monitoring and controlling the concentration of ozone in water. Furthermore, prior art ozone generating devices have heretofore only been capable of producing an ozonated gas stream comprising approximately 1%–2% ozone by weight.

Accordingly there exists a need for a system and method for generating and dispersing ozone in a fluid for use as a cleaning or sterilizing agent, which system effectively produces a large quantity of ozone from a highly pure oxygen feed gas, effectively blends large quantities of ozone in a given volume of water, and is capable of precisely monitoring and controlling the concentration of ozone.

SUMMARY OF THE INVENTION

The present invention relates to a system and method for generating ozone for use in open or closed loop process applications using a fluid, such as water, as a primary process medium. The system includes: a water storage tank, including a water supply line, for temporarily storing water for treatment and subsequent use in a process; an electromagnetic flux unit connected to the water supply line for exposing water supplied to the tank to an electromagnetic field thereby magnetically polarizing contaminants and dissolved solids present in the water; an apparatus for producing highly pure oxygen from ambient air for use as a feed gas in generating ozone; a corona discharge ozone generator for producing high purity ozone from a highly pure oxygen feed gas; an impeller apparatus for injecting ozone, created by the ozone generator into water wherein the ozone is absorbed, including a rapidly spinning shear impeller which is capable of yielding a substantially high level of dissolved ozone gas in a given volume of water; an apparatus for measuring the concentration of dissolved ozone present in water; and a microprocessor based controller for controlling the system to reach and maintain suitable ozone concentration levels, depending on the application, whereby the ozone containing water is suitable for use in a wide variety of process applications.

In the preferred embodiment, process water is obtained from a suitable water supply source and piped to the water storage tank via a water supply line. The supply line includes an automatic flow control valve having an open position wherein water is allowed to flow into the tank, and a closed position wherein water flow is terminated. High and low water level sensors provide feedback to a controller electrically connected to the automatic valve to maintain a desired volume of water in the tank. A pump is fluidly connected to the water tank for providing a supply of ozonated water to a wide variety of process applications.

The water supply line includes an electromagnetic flux unit which includes a conductive coil wrapped around a portion of the supply line. The electromagnetic flux unit creates an electromagnetic force (hereinafter "E.M.F.") using a complex modulating frequency waveform thereby producing a Lorentz force and removing surface charges and magnetically polarizing micro particles suspended in solution. Exposing the water to an electromagnetic force causes the water to absorb dissolved ozone more readily thereby enabling increased ozone concentration levels.

The system further includes an apparatus for producing highly pure oxygen from ambient air for use as a feed gas in generating ozone (hereinafter "oxygen concentrator"). The oxygen concentrator comprises a pressure swing absorption device for removing substantially all of the nitrogen from ambient air and producing a highly pure feed gas comprising approximately 92%–95% pure oxygen. The highly pure oxygen gas comprises a feed gas for an apparatus for producing ozone (hereinafter "ozone generator") which comprises a corona discharge device operating at a specific high frequency to produce ozone. The ozone generator further includes a unique corona discharge unit for producing an ozonated gas from the oxygen feed gas, which ozonated gas comprises approximately 4% ozone by weight and which is substantially free of nitrous oxides.

An impeller apparatus, submerged in the water storage tank for injecting and blending ozone created by the ozone generator, is fluidly connected to the ozone generator. The impeller apparatus is motor driven and includes a rapidly spinning shear impeller which is capable of yielding a substantially high level of dissolved ozone gas in a given volume of water. The rapidly spinning shear impeller further functions to create a vacuum for drawing ozonated gas from the ozone generator into the water thereby eliminating any need for a pump. The use of an impeller apparatus to deliver ozone gas into the water within the storage tank results in a rapid increase in ozone concentration and further results in higher overall ozone concentration levels in water than have been heretofore realized.

The water storage tank further includes an ozone concentration sensor for monitoring ozone concentration in water. In the preferred embodiment the sensor comprises an oxidation reduction potential sensor (hereinafter "ORP Sensor"). The ORP sensor measures the concentration of dissolved ozone by sensing the oxidation reduction potential of the water, an electrochemical property measured in millivolts (mV). The present invention contemplates maintaining the water within the tank with an ozone concentration level in excess of 800 mV as measured by the ORP sensor. Furthermore, in the event that the ozone concentration level is below 800 mV the system will not transfer water from the tank for use in a process.

A microprocessor based digital control unit (hereinafter "DCU") is in electrical communication with each of the above-referenced system components and associated accessory devices to provide operational command and control of the system. Specifically, the DCU electrically communicates with high and low water level sensors and the automatic flow control valve, and the electromagnetic flux unit to maintain a sufficient volume of magnetically polarized water within the storage tank. In addition, the DCU electrically communicates with the ORP sensor to monitor ozone concentration. In the event that the ozone concentration falls below a desirable level (e.g. 800 mV as sensed by the ORP sensor), the DCU activates the ozone generating and handling components, namely, the oxygen concentrator, the ozone generator, and the impeller apparatus, thereby injecting ozone into the water until the ozone concentration rises to the desirable level. In the event that the system fails to operate properly and does not raise the ozone concentration level, an alarm is triggered for calling attention to abnormal system operation.

It should be noted that the present invention is suitable for use with open and closed loop process applications in a wide variety of fields such as industrial water treatment and process applications, as well as biomedical, food processing, hospital operating rooms, laundry and disposal rooms, food service applications, hotels, restaurants, and livestock industries, and any other application wherein ozone or ozonated water is useful.

In accordance with these and other objects which will become apparent hereinafter, the instant invention will now be described with particular reference to the accompanying drawings.

BRIEF DESCRIPTION OF THE DRAWINGS

FIG. 1 is a schematic illustration of a system for generating and transferring ozone into water according to the present invention;

FIG. 2 is an exploded view of the corona discharge element with the resin coating partially cut-away;

FIG. 3 is a side sectional view of an end cap for the corona discharge element;

FIG. 4 is a sectional view of the corona discharge element along line 4—4 in FIG. 2;

FIG. 5 is an exploded perspective top front view of the preferred embodiment of the impeller apparatus;

FIG. 6 is a perspective top front view of the preferred embodiment of the impeller apparatus of the present invention;

FIG. 7 is an exploded perspective top front view of an alternate embodiment of the impeller apparatus of the present invention;

FIG. 8 is a partial side view of an impeller apparatus illustrating mixing patterns of discharged ozone gas in a fluid;

FIG. 9 is a partial side sectional view of the alternate impeller components of the present invention;

FIG. 10 is a sectional view of the rotating impeller member.

DESCRIPTION OF THE PREFERRED EMBODIMENTS

Turning now to the drawings, FIG. 1 schematically illustrates the ozone generating and distribution system of the present invention, generally referenced as 10. The system includes: a microprocessor based control unit 20; an oxygen concentrator 30, fluidly connected to an ozone generator 40; a submerged impeller apparatus 50, fluidly connected to ozone generator 40, for distributing ozone to a fluid within a storage tank 60. Water storage tank 60 further includes: a fluid level sensing apparatus 70; a water supply line 80 incorporating a flow control valve 82 and a flux unit 84; a water discharge line 90 including a pump 92; and an ozone concentration sensor 100.

As depicted in FIG. 1, control unit 20 is electrically connected to the various system components to provide overall command and control of the system. In operation, oxygen concentrator 30 provides a source of high purity oxygen from ambient air. In the preferred embodiment, oxygen concentrator 30 comprises a pressure swing absorption device for removing substantially all of the nitrogen from ambient air and producing a highly pure feed gas comprising approximately 92%–95% pure oxygen. Oxygen concentrator 30 includes an air intake filter in fluid communication with at least one air compressor, whereby ambient air is filtered and compressed. The filtered and compressed air is then transferred to an after-cooler, such as a fin and tube heat transfer coil having a fan for forcing air thereacross, to increase the density of the compressed air. Oxygen concentrator further includes at least one molecular sieve through which the filtered, compressed, and after-cooled air is passed, and wherein moisture and nitrogen are removed resulting in a feed gas comprising approximately 92%–95% pure oxygen having a dew point of approximately –40° F. The resulting feed gas is thus substantially free from nitrogen, and provides a suitable feed gas for ozone generation. Accordingly, oxygen concentrator 30 includes a feed gas outlet conduit 32 in fluid communication with ozone generator 40. Outlet conduit 32 includes high and low pressure devices 34 and 36, for indicating high and low pressure operating conditions which are outside an acceptable range.

Ozone generator 40 comprises a high frequency corona discharge device for generating ozone from the feed gas produced by oxygen concentrator 30. The purified oxygen feed gas is transferred through conduit 32 to ozone generator 40 wherein the gas is exposed to a high voltage corona discharge energy source to produce ozone which is subsequently transferred through an output conduit 41. In the preferred embodiment, ozone generator 40 is powered by an alternating current power source and includes a high voltage transformer to step the power source voltage up to a suitable high voltage (e.g. 5,000–10,000 V.A.C.).

Ozone generator 40 includes at least one corona discharge element, generally referenced as 42 and depicted in FIGS. 2, 3 and 4, comprising a generally cylindrical glass tube 43 which contains an electrode 44 received therein. Electrode 44 comprises a cylindrical stainless steel mesh inner sleeve 44a coated with a terpolymer conductive coating 44b. Electrode 44, and more particularly stainless steel inner sleeve 44a, is connected to a high voltage power source (not shown) via a high voltage lead 45. Glass tube 43 is axially received within a generally cylindrical stainless steel outer sleeve 46 in spaced relation therewith such that a gap of approximately 7/100" exists between the outer surface of glass tube 45 and the inner surface of outer sleeve 46. Outer sleeve 46 is received within a heat sink structure, generally referenced as 47, for dissipating heat generated by corona element 42.

In the preferred embodiment, outer sleeve 46 is fabricated from stainless steel having a high nickel/low iron content since it has been found that conventional stainless steel includes an undesirably high iron/low nickel content which, if used in a high voltage corona discharge element, causes iron to separate from the stainless steel whereafter the iron may be deposited on various system components as iron oxide. Since iron is conductive, deposits of iron oxide on various conductive and non-conductive system components results in short circuiting, rust accumulation, and is believed to be a leading cause of corona generator system failure. The problem of iron separation is further addressed by sintering or passivating of the stainless steel outer sleeve 46 whereby the atoms present in the stainless steel are fused together thereby preventing any residual iron from separating from the sleeve structure.

A pair of end caps 48a and 48b are connected to each end of the corona discharge element assembly and are each sealed by a plurality of O-rings, referenced as 48o. End cap 48a is fluidly connected to oxygen concentrator feed gas outlet conduit 32, and end cap 48b is fluidly connected, via output conduit 41, to an impeller apparatus, generally referenced as 50, for reasons that will be further described herein below. As best depicted in FIG. 3, each end cap 48a and 48b defines an axial opening for receiving a portion of an elongate rigid rod 49 therethrough for securely holding the corona discharge element 42 together. In the preferred embodiment, rod 49 is fabricated from an ozone resistant plastic, such as Kynar, and includes threaded end portions 49a and 49b for receiving threaded nuts 49c thereon.

In addition, ozone generator 40 includes power supply controls for modulating the frequency of the power supplied to the corona discharge element. In the preferred embodiment the frequency is raised to approximately 600 Khz, where it has been found that ozone is produced much more efficiently than would be realized by similar systems operating at 60 Hz. When a high voltage is applied to the electrode, an electric field is produced creating a corona charge on the outside of the glass tube. The corona charge interacts with oxygen ($O_2$) in the feed gas to break the oxygen down into individual oxygen molecules (O). A portion of the oxygen molecules recombine into ozone ($O_3$). Accordingly, ozone generator 40 converts the feed gas into a mixture of oxygen and ozone, which mixture comprises approximately 4% ozone by weight and is substantially free of nitrous oxides.

As depicted in FIG. 1, an impeller apparatus 50' is fluidly connected to ozone generator 40 via output conduit 41, for transferring output gas, comprising a mixture of oxygen and ozone, from ozone generator 40 for introduction into water within the tank wherein the ozone remains dissolved. A preferred embodiment of impeller apparatus 50 is depicted in FIGS. 5 and 6, and includes a motor 52 for providing rotational power, and an impeller assembly having a rotating impeller member 54 connected to motor 52 by drive shaft 53 and sleeve 55. Sleeve 55 includes a fitting 55a for fluid connection to ozone generator 40 via output conduit 41. Impeller apparatus 50 may be mounted in any suitable submerged configuration or orientation (e.g. vertical, horizontal, angled).

In the preferred embodiment, rotating impeller member 54 includes a shape which is generally square in plan view, and incorporates a plurality of gas outlet apertures 54a each communicating with a central aperture 54b, and each disposed proximate a corner, as best depicted in FIG. 10. Accordingly, motor 52 and drive shaft 53 function to rapidly rotate rotating impeller member 54 thereby generating a venturi-type vacuum or negative pressure within sleeve 55 which causes ozonated gas to flow from ozone generator 40 into sleeve 55 via output conduit 41 and fitting 55a, whereafter the ozonated gas is drawn through apertures 54a and dispelled into the water within tank 60. Rapid rotation of impeller member 54 causes a shearing effect proximate apertures 54a which results in ozonated gas being dispelled and dispersed in the water in the form of fine gas bubbles thereby resulting in rapid absorption of the gas into the water.

FIG. 7 depicts an alternate embodiment impeller apparatus 50' having a submersible motor 52', a fixed outer member 56 and an alternate rotating impeller member 54'. Outer fixed member 56 has an inner surface defining an axial aperture 56a for axially receiving a cylindrical projecting portion 54b, of rotating impeller member 54', therein, whereby rotating impeller member 54' is freely rotatable within outer member 56. Alternate impeller member 54' and fixed member 56 define an internal chamber 58 when axially joined. Fixed member 56 further includes an inlet aperture 56b communicating with internal chamber 58, and rotating member 54' defines a plurality of outlet apertures 54a' communicating with chamber 58. In the alternate embodiment, ozone generator output conduit 41 is connected to fixed member 56 at aperture 56b such that rotation of rotating member 54' creates a vacuum within chamber 58 thereby drawing output gas from ozone generator 40 into chamber 58 whereafter the gas is dispelled via rotating member apertures 54a' and introduced into the water within tank 60. In the alternate embodiment, fixed member 56 further includes a plurality of projecting shear members 56c which are positioned substantially adjacent to the peripheral edge of rotating member 54 such that rotation of member 54 causes projecting shear members to enhance the shearing of ozonated gas exiting apertures 54a thereby creating a swirling vortex of small gas bubbles and water which greatly enhances ozonation of the water by maximizing the amount of gas which is dissolved in solution.

Accordingly, impeller apparatus 50 provides for more rapid ozonation of a given volume of water than is realized by conventional ozonation methods. While the preferred embodiment utilizes a fixed member 56 and a rotating member 54 according to the structure disclosed in the drawings herein, any suitable impeller apparatus is considered within the scope of the invention.

FIG. 8 depicts a side view of the impeller gas discharge mix pattern, of the alternate embodiment impeller apparatus, illustrated by the area designated "D", and an effective mixing regime illustrated by the area designated "R". The dimensions for each area "D" and "R" will necessarily vary depending upon the size and shape of the impeller apparatus and speed of rotation.

FIG. 9 depicts a partial cross-sectional view of the alternate embodiment shear member 56 and rotating member 54', wherein chamber 58 is clearly depicted and defined by surfaces of members 56 and 54', such that rotating member 54' generates a venturi suction for drawing ozonated gas from ozone generator 40 and dispelling the gas into water, or other suitable fluid, within the tank.

In the preferred embodiment, a water source, which may include obtaining process water from a suitable water supply line 80 and piping the water to storage tank 60 is contemplated. Water storage tank 60 comprises a storage tank having a storage capacity of between 50 and 150 gallons, however, any suitable capacity is considered within the scope of the invention. Water supply line 80 further includes an automatic flow control valve 82 having an open position wherein water is allowed to flow into the tank, and a closed position wherein water flow is terminated, and a flux unit 84 which includes a conductive coil 84a wrapped around a portion of the supply line. Flux unit 84 generates an electromagnetic radio frequency signal (hereinafter "RF signal") using a complex modulating frequency waveform in the acoustic range, which is transmitted to the water in supply line 80 via conductive coil 84a thereby producing a Lorentz force for removing the surface charge from micro particles suspended in solution. Removing the surface charge from micro particles suspended in solution causes the water to more readily accept dissolved ozone thereby enabling increased ozone concentration levels as compared with an equal volume of water that has not be exposed to an RF signal as described above.

Tank 60 further includes a fluid level sensing apparatus 70 electrically connected to control unit 20. Sensing apparatus 70 includes high and low level indicating floats, 72 and 74 respectively, and high and low level alarm floats, 76 and 78 respectively. High and low water level floats 72 and 74 provide feedback to a controller electrically connected to the automatic valve to maintain a desired volume of water in the tank. A pump 92 is fluidly connected to the water tank for providing a supply of ozonated water to a wide variety of process applications. It may be desirable to eliminate tank 60 in certain applications wherein the present invention is capable of sufficiently ozonating water while the water flows through a section of conduit housing impeller 50.

Water storage tank 60 further includes an ozone concentration sensor 100 for monitoring ozone concentration in water. In the preferred embodiment the sensor comprises an oxidation reduction potential sensor (hereinafter "ORP Sensor"). ORP sensor 100 measures the concentration of dissolved ozone by sensing the oxidation reduction potential of the water, an electrochemical property measured in millivolts (mV). The present invention contemplates maintaining the water within the tank with an ozone concentration level in excess of 800 mV as measured by ORP sensor 100.

Microprocessor based digital control unit 20 (hereinafter "DCU"), is in electrical communication with the above-referenced system components and associated accessory devices as illustrated in FIG. 1 to provide operational command and control of the system. Specifically, as best depicted in FIG. 1, DCU 20 electrically communicates with high and low water level sensors, 72 and. 74, and control valve 82, and flux unit 84 to maintain a sufficient volume of magnetically polarized water within the storage tank. In addition, DCU 20 electrically communicates with ORP sensor 100 to monitor ozone concentration. In the event that the ozone concentration falls below a desirable level (e.g. 800 mV as sensed by the ORP sensor), the DCU activates the ozone generating and handling components, namely, oxygen concentrator 30, ozone generator 40, and impeller apparatus 50, such that the system thereby generates and injects ozone into the water until the ozone concentration rises to the desirable level. The use of impeller mixing apparatus 50 and flux unit 84, and the ability of the system to produce ozonated gas having a high level of ozone concentration further allows for rapid absorption of ozone into water within tank 60 resulting in a system that is capable of producing large quantities of highly ozonated water for a variety of applications.

The present invention is particularly useful in providing a source of ozonated water for use in laundry applications thereby substantially eliminating the need for chemicals, detergents and the like. Furthermore, the present invention is suitable for use with open and closed loop process applications in a wide variety of fields such as industrial water treatment and process applications, as well as biomedical, food processing, hospital operating rooms, laundry and disposal rooms, food service applications, hotels, restaurants, and livestock industries, and any other application wherein ozone or ozonated water is useful.

The instant invention is capable of being skid mounted as a single assembly (indicated by dashed line surrounding FIG. 1 schematic illustration) whereby all of the above-referenced components are combined into a single unit having water input and output connections and a power connection. Accordingly, the present invention may be easily transported to a specific location and placed into service by connecting water and power thereto.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A system for generating and introducing ozone into a fluid for use in open or closed loop process applications, said system comprising:

a fluid tank for containing a fluid;

means for producing highly pure oxygen from ambient air for use as a feed gas in generating ozone;

means for producing ozone, fluidly connected to said means for producing highly pure oxygen, for producing ozone from said feed gas, said means for producing ozone producing an output gas substantially consisting of a mixture of ozone and oxygen;

impeller means mounted in said fluid tank, fluidly connected to said means for producing ozone and configured to be submerged within said fluid, for directly supplying ozone into said fluid in said fluid;

means for measuring the concentration of dissolved ozone in said fluid; and ozone concentration control means for controlling said ozone amount in said fluid to reach and maintain suitable ozone concentration levels in said fluid.

2. A system according to claim 1, wherein said means for producing highly pure oxygen comprises a pressure swing absorption device for removing substantially all of the nitrogen from ambient air and producing a highly pure feed gas comprising approximately 92%–95% pure oxygen from ambient air.

3. A system according to claim 1, wherein said means for producing ozone comprises a high voltage corona discharge device operating above 60 Hz.

4. A system according to claim 3, wherein said high voltage corona discharge device operates at approximately 600 kHz.

5. A system according to claim 3, wherein said corona discharge device includes at least one corona discharge element comprising a sealed glass tube containing an electrode including an inner mesh stainless steel sleeve electrically connected to a high voltage power source, and an outer cylindrical stainless steel sleeve in spaced, surrounding relation with said glass tube.

6. A system according to claim 1, wherein said impeller means comprises a fixed shear member and a rotating member matingly joined with said fixed shear member, said rotating member and said shear member having surfaces defining an internal chamber, said chamber communicating with said means for producing high purity ozone, said rotating member further defining at least one aperture communicating with said chamber and having an outlet communicating with said fluid, such that rotation of said rotating member creates a reduced pressure within said chamber thereby causing said output gas to flow from said means for producing ozone into said chamber and into said fluid via said rotating member aperture for introducing said output gas into said fluid whereby a concentration of ozone is dissolved therein.

7. A system according to claim 6, wherein said shear member includes at least one shear surface substantially adjacent to said rotating member outlet such that output gas is sheared from said outlet by rotation of said rotating member thereby dispersing said output gas into said fluid in fine bubbles.

8. A system according to claim 1, wherein said means for measuring said concentration of dissolved ozone comprises an oxidation reduction potential sensor.

9. A system according to claim 1, wherein said control means comprises a microprocessor based control system electrically connected to said means for producing highly pure oxygen, said means for producing ozone, said impeller means, and said means for measuring the concentration of dissolved ozone in said fluid.

10. A system for generating and introducing ozone into a fluid for use in open or closed loop process applications, said system comprising:

a fluid tank for containing a fluid;

means for producing highly pure oxygen from ambient air for use as a feed gas in generating ozone;

means for producing ozone, fluidly connected to said means for producing highly pure oxygen, for producing ozone from said feed gas, producing an output gas substantially consisting of a mixture of ozone and oxygen;

impeller means mounted in said tank, fluidly connected to said means for producing ozone and configured to be submerged within said fluid, for introducing ozone into said fluid, said impeller means comprising a fixed shear member and a rotating member matingly joined with said fixed shear member, said rotating member and said shear member having surfaces defining an internal chamber, said chamber communicating with said means for producing high purity ozone, said rotating member further defining at least one aperture communicating with said chamber and with said fluid, wherein said rotating member creates a reduced pressure within said chamber thereby causing said output gas to flow from said means for producing ozone into said chamber and into said fluid via said rotating member aperture for introducing said output gas into said fluid;

means for measuring the concentration of dissolved ozone in said fluid; and concentration control means for controlling the amount of ozone in said fluid in order to reach and maintain suitable ozone concentration levels in said fluid.

11. A method for generating and introducing ozone into a fluid for use in open or closed loop process applications, said method comprising the steps of:

producing highly pure oxygen from ambient air for use as a feed gas in generating ozone;

generating ozone from said feed gas;

directly supplying said ozone into said fluid through a submerged shear impeller to disperse fine bubbles of ozone into said fluid;

measuring the concentration of dissolved ozone in said fluid; and controlling the rate of ozone generation and introduction into said fluid to obtain a predetermined ozone concentration level in solution.

* * * * *